US008952783B2

(12) United States Patent
Fitzgibbon

(10) Patent No.: US 8,952,783 B2
(45) Date of Patent: *Feb. 10, 2015

(54) BARRIER MOVEMENT OPERATOR COMMUNICATIONS

(75) Inventor: James J. Fitzgibbon, Batavia, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 565 days.

This patent is subject to a terminal disclaimer.

(21) Appl. No.: 13/240,605

(22) Filed: Sep. 22, 2011

(65) Prior Publication Data

US 2012/0008758 A1 Jan. 12, 2012

Related U.S. Application Data

(63) Continuation of application No. 11/058,135, filed on Feb. 15, 2005, now Pat. No. 8,040,217.

(51) Int. Cl.

| | |
|---|---|
| ***B60R 25/00*** | (2013.01) |
| ***G05B 19/00*** | (2006.01) |
| ***G06F 7/00*** | (2006.01) |
| ***H04B 1/00*** | (2006.01) |
| ***E05F 15/16*** | (2006.01) |
| *E05F 15/00* | (2006.01) |

(52) U.S. Cl.

CPC ......... *E05F 15/1607* (2013.01); *E05Y 2400/80* (2013.01); *E05Y 2400/86* (2013.01); *E05Y 2900/106* (2013.01); *E05F 15/00* (2013.01)

USPC ............ 340/5.71; 340/5.7; 340/5.74; 340/5.8

(58) Field of Classification Search

CPC .......... B60R 25/00; G05B 19/00; G06F 7/00; H04B 1/00; H04Q 1/00

USPC .......... 340/5.71, 5.7, 5.74, 5.8; 455/403, 466; 160/188; 235/382; 49/13, 31

See application file for complete search history.

(56) References Cited

U.S. PATENT DOCUMENTS

| | | | | |
|---|---|---|---|---|
| 4,464,651 A | | 8/1984 | Duhame | |
| 4,475,069 A | | 10/1984 | Tadokoro et al. | |
| 5,226,256 A | | 7/1993 | Fries et al. | |
| 5,475,750 A | | 12/1995 | McMonagle, Jr. et al. | |
| 5,605,013 A | | 2/1997 | Hogston | |
| 5,963,631 A | * | 10/1999 | Fazio et al. | 379/202.01 |

(Continued)

FOREIGN PATENT DOCUMENTS

EP 0846991 11/1997

OTHER PUBLICATIONS

Canadian Patent Application No. 2,536,550; Office Action Dated Jun. 4, 2012.

(Continued)

*Primary Examiner* — Nam V Nguyen

(74) *Attorney, Agent, or Firm* — Fitch Even Tabin & Flannery LLP

(57) ABSTRACT

A moveable barrier operator actuates an actuator thereby causing a message to be formed. The message indicates that the user at the moveable barrier operator requires assistance. A communication channel is established between the moveable barrier operator and an assistance center. The message is transmitted to the assistance center over the communication channel. An assistance action is performed to provide assistance to the user at the moveable barrier operator.

11 Claims, 3 Drawing Sheets

(56) References Cited

U.S. PATENT DOCUMENTS

| | | | | |
|---|---|---|---|---|
| 6,028,537 | A | 2/2000 | Suman et al. | |
| 6,072,402 | A * | 6/2000 | Kniffin et al. | 340/5.28 |
| 6,184,787 | B1 | 2/2001 | Morris | |
| 6,218,956 | B1 | 4/2001 | Davis et al. | |
| 6,256,479 | B1 | 7/2001 | Hoffmann et al. | |
| 6,278,249 | B1 | 8/2001 | Fitzgibbon et al. | |
| 6,484,784 | B1 * | 11/2002 | Weik et al. | 160/7 |
| 6,661,340 | B1 | 12/2003 | Saylor et al. | |
| 6,728,612 | B1 | 4/2004 | Carver et al. | |
| 6,847,292 | B2 | 1/2005 | Nlabu | |
| 6,873,127 | B2 | 3/2005 | Murray | |
| 6,882,905 | B2 | 4/2005 | Hall et al. | |
| 6,945,303 | B2 | 9/2005 | Weik, III | |
| 6,975,203 | B2 * | 12/2005 | Brookbank et al. | 340/5.26 |
| 6,993,123 | B1 * | 1/2006 | Allen et al. | 379/215.01 |
| 7,248,161 | B2 | 7/2007 | Spoltore et al. | |
| 7,331,144 | B2 | 2/2008 | Parsadayan | |
| 7,493,726 | B2 | 2/2009 | Fitzgibbon et al. | |
| 8,040,217 | B2 | 10/2011 | Fitzgibbon | |
| 2006/0015398 | A1 | 1/2006 | Weik, III | |
| 2006/0173733 | A1 | 8/2006 | Francher | |

OTHER PUBLICATIONS

U.S. Appl. No. 11/058,135; Final Rejection Dated Mar. 11, 2011; pp. 1-12.

* cited by examiner

BARRIER MOVEMENT OPERATOR COMMUNICATIONS

This application is a continuation of U.S. application Ser. No. 11/058,135, filed Feb. 15, 2005, now U.S. Pat. No. 8,040, 217, the contents of which are incorporated by reference as if fully re-written herein.

FIELD OF THE INVENTION

The field of the invention relates to moveable barrier operators and, more specifically, to obtaining assistance at a moveable barrier operator.

BACKGROUND

Different types of moveable barrier operators have been sold over the years and these systems have been used to actuate various types of moveable barriers. For example, garage door operators have been used to move garage doors while gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

Sometimes, users experience difficulties or have questions arise when attempting to install or operate the moveable barrier operator. Often, manuals and other types of information provided to the user with the device are lost or do not completely resolve the problem or answer the question. In such cases, the user often needs additional assistance, for example, from an assistance or a help center in order to address and resolve the problem.

In previous systems, one way to gain such assistance was to make a phone call to an assistance center. However, such approaches were inconvenient because they required that the user memorize or otherwise have available the telephone number or other contact information of the center. Even if the telephone number and other information were memorized or otherwise available, the numbers and information sometimes changed making it difficult or impossible to obtain the needed assistance. In addition, any help provided relied upon the users ability to correctly describe the situation. All of the above-mentioned problems associated with previous systems resulted in user inconvenience and frustration and, frequently, the inability to resolve barrier operator problems in a timely manner.

SUMMARY

A system and method allows a user at a moveable barrier operator to obtain assistance from an assistance center in an efficient and timely manner. A communication channel is automatically and seamlessly established between the operator and the assistance center. The convenient establishment of the communication channel allows assistance to be provided quickly to the user at the barrier operator thereby eliminating the requirement of the user to memorize or have access to contact information of the assistance center. In addition, these approaches do not rely upon the ability of the user to correctly describe the problem or conditions at the operator.

In accordance with the principles described herein, a user at a moveable barrier operator actuates an actuator thereby causing a message to be formed. The message indicates that the user at the moveable barrier operator requires assistance. A communication channel is established between the moveable barrier operator and an assistance center. The message is transmitted to the assistance center over the communication channel. An assistance action is performed to provide assistance to the user at the moveable barrier operator.

The communication channel may be a cell phone channel, an Internet channel, satellite channel, digital service channel, or a land line telephone channel. These channels may be wired or wireless. The wireless channels can be a data service. Other types of communication channels may also be used. The assistance action that is performed may include returning a message to a user over the communication channel, initiating a phone call to the user, mailing a response to the user, or sending a human representative to contact the user. Other example of assistance actions are possible.

Advantageously, the operator may include a plurality of electronically controlled settings of various parameters and the selected settings of the operator may be read and/or changed from the assistance center. For long term maintenance, readings from the operator may be monitored at the assistance center. The readings may include a maximum travel distance, serial number information, an amount of force required, a speed of travel, error information, a force, a number of usages, a temperature, a force profile, a number of reversals, a code version, and reasons for reversals. Other examples of readings are possible. In addition, manufacturing information and field problem reports concerning the operator may be accessed using the serial number information or code version and this additional information may be sent to the operator or used at the assistance center to resolve the problem.

Thus, approaches that give assistance for users at a moveable barrier operator are provided. The approaches provided herein enable the quick and timely provisioning of assistance from an assistance center for a user at a moveable barrier operator. Users do not have to memorize phone numbers or other information in order to contact the assistance center. As a consequence, information is provided to users in a timely manner to allow for the quick resolution of problems that occur at moveable barrier operators.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
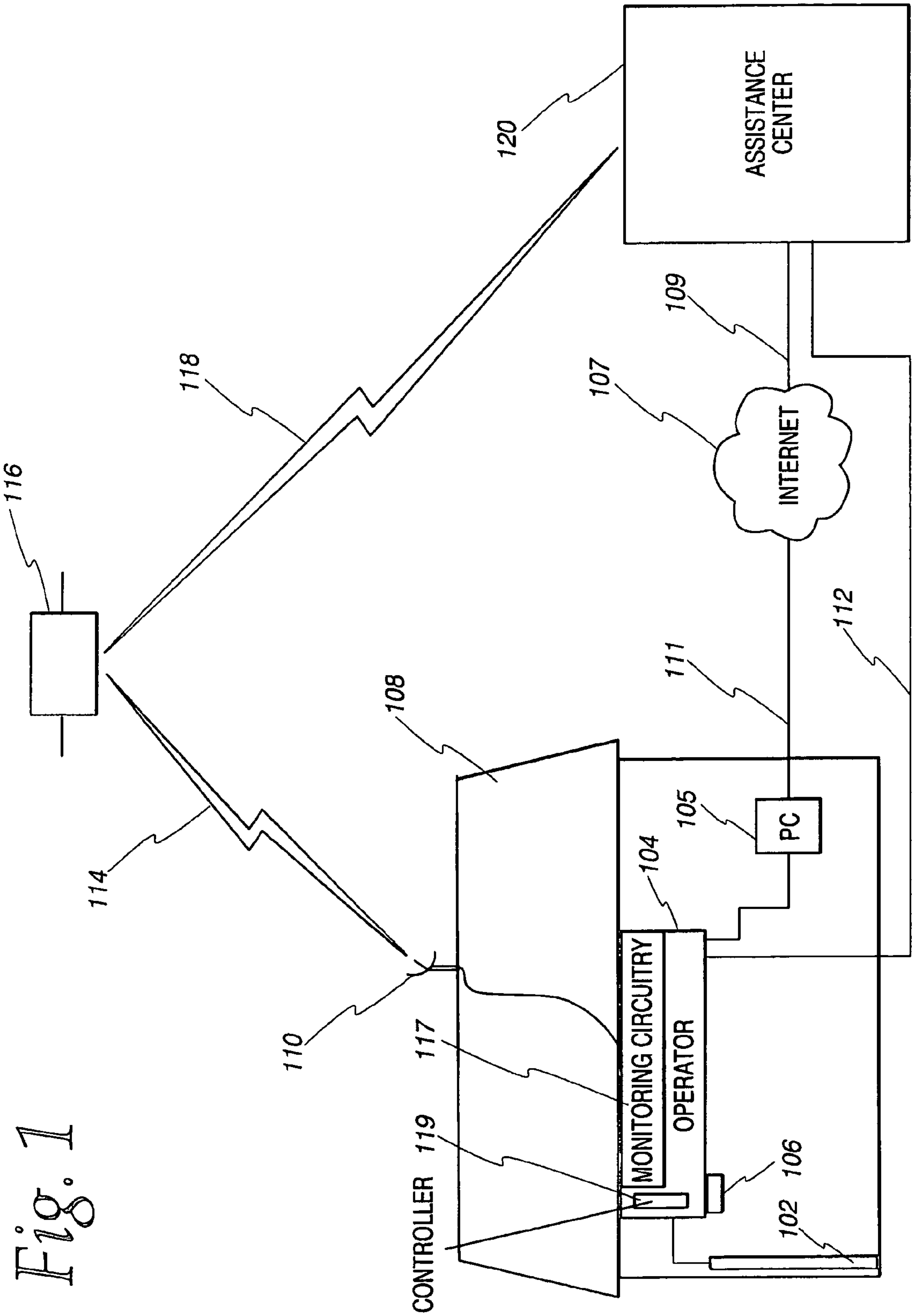
FIG. 1 is a block diagram of a system for obtaining assistance at a moveable barrier operator according to the present invention.

Referring now to the drawings and especially FIG. 1, a system and method for providing assistance to a user at a moveable barrier operator are described. A moveable barrier operator 104 is situated in a garage 108. In this case, the operator 104 is a garage door opener. However, the operator may also be a gate operator or a swinging door operator, or other type of operator. The moveable barrier operator 104 is coupled to and actuates a barrier 102. In this case, the barrier 102 is a garage door. However, the barrier 102 may also be a swinging gate, a sliding gate, a swinging door, or some other type of barrier. Other types of operators and barriers than those mentioned above are possible.

The operator 104 includes an assistance button 106, which may be any type of actuator or switch, and which is pressed by a user at the operator 104 when the user desires assistance. Although shown attached to the operator 104, the assistance button 106 may be placed in the vicinity of the operator 104 and communicatively coupled to the operator 104. In this regard, the button 106 may be placed on a wall control unit or may be incorporated into a portable transmitter. The assistance button 106 may be a dedicated button whose sole purpose is to call for assistance or the button 106 may be a button that performs other functions besides calling for assistance.

Actuating the assistance button 106 triggers the formation of a communication channel between the operator 104 and an assistance center 120. The communication channel is used to send a request for assistance from the user to the assistance center 120 and may also be used to transmit other communications (e.g., assistance information, readings from the operator, and questions from the user) between personnel at the assistance center 120 and the user.

The assistance center 120 provides all components and equipment needed to provide assistance to users at the operator 104 and may be automated or staffed with human personnel. The assistance center 120 may also include components that enable the staff members at the center 120 to assist users at the operator 104. In this regard, the assistance center 120 may include computers and memory storage devices that store data relating to previous problems at the barrier operator 104 and current or previous conditions measured at the barrier operator 104. In addition, manuals or other technical assistance information may be stored on the data storage devices. This information may be sent to a user at the operator 104 or used to help diagnose or solve problems at the operator 104.

As mentioned, the system of FIG. 1 includes several types of communication channels to send an assistance request to the assistance center 120 and allow the operator 104 and assistance center 120 to communicate with each other. These channels may include land line channels, cellular channels, Internet channels, satellite channels, and digital service channels. The channels may be wired or wireless. It will be understood that only one communication channel is needed and additional examples of communication channels other than those described herein are possible.

For instance, a telephone communication channel 112, which may be a land line or a cellular phone link, is provided between the operator 104 and the assistance center 120. In one example, when a land line connection, the connection may be a wireless connection in a home. If the channel 112 is a land line link, the operator 104 may include circuitry that connects the operator to the land line link, automatically dials the assistance center 120 over the land line link, and allows the user to communicate with the assistance center 120. For example, the operator 104 may include or be connected to a dedicated telephone, which allows the user to directly speak to personnel at the assistance center 120. Alternatively, an automated message requesting assistance may be transmitted from the operator 104 to the assistance center 120 over the communication channel 112 using the telephone. Once the automated message is sent, the channel 112 may be disconnected to allow personnel at the assistance center 120 to phone the user.

In the case of the channel 112 being a cellular phone link, the operator may include or be coupled to a cellular phone. The cellular phone may automatically dial the telephone number of the assistance center 120 and the user can speak to personnel at the assistance center 120. Alternatively, an automated message requesting assistance may be sent from the operator 104 to the assistance center 120 using the cellular phone. Once the automated message is sent, the channel 112 may be disconnected to allow personnel at the assistance center 120 to phone the user.

Satellite communication channels 114 and 118 may also be provided. In this case, the channels are established between a transmitter/receiver 110 (coupled to the operator 104) and the assistance center 120. Once the channels 114 and 118 are established, the user at the operator 104 and personnel at the assistance center 120 can communicate with each other. The communications can be in the form of voice or any other type of communications. Alternatively, an automated message can be sent to the assistance center using the channels 114 and 118.

In still another example of a communication channel, the assistance center 120 is connected to the Internet 107 via an Internet communication channel 109. The Internet 107 is also connected to a personal computer 105 via an Internet communication channel 111 and the personal computer 105 is connected to the moveable barrier operator 104. In this example, the pressing of the button 106 causes a signal to be sent to the personal computer 105 from the operator 104. The personal computer 105 receives the signal and then forms and sends another message, such as an email or instant message, to the assistance center 120 requesting assistance. In other examples, the Internet communication channels do not require the use of a personal computer.

The assistance center 120 may take various readings or monitor various settings or conditions at the operator 104 via monitoring circuitry 117 (located in the operator 104). Readings may be relayed from the monitoring circuitry 117 of the operator 104 to the assistance center 120 via any of the communication channels mentioned above and may include, by way of example, a maximum travel distance, serial number information, an amount of force required, a speed of travel, error information, a force, a number of usages, a temperature, a force profile, a number of reversals, code version, and reasons for reversals. Other examples of readings are possible.

The readings obtained from the operator 104 may be used at the assistance center 120 to perform additional actions. For example, manufacturing information and field problem reports concerning the operator 104 may be accessed using the serial number information or code version that was obtained from the operator 104.

The communication channels mentioned previously may also be used to transmit messages or other information that control settings of the operator 104. For example, personnel at the assistance center 120 may change selected settings of the operator 104 such as the maximum amount of force to apply to the barrier 104 and pause times of the barrier 104. In this regard, the messages may be received at a controller 119 associated with the operator 104. The controller 119 is then used to adjust the settings of the operator 104.

The settings may also be changed by personnel at the assistance center 120 to expedite solutions to problems at the operator 104. In this regard, messages may be sent by any of the communication channels to the controller 119 within the operator 104. The controller 119 responsively adjusts the settings according to the message received. The assistance center 120 may then test the change by informing the user and then activating the unit. This would demonstrate the success of the changes.

In one example of the operation of the system of FIG. 1, the button 106 at the moveable barrier operator 104 is actuated thereby causing a communication channel to be established. For example, a land line telephone channel 112, is automatically established between the moveable barrier operator 104 and the assistance center 120 and an automated message requesting assistance is transmitted to the assistance center 120 over the communication channel 112.

The message is received at the assistance center 120 and an assistance action is performed to provide assistance to the user at the moveable barrier operator 104. For example, personnel at the center 120 may communicate with the user at the operator 104 over a cellular phone link, the same or different land line telephone link, or by sending an email or instant message to a computer associated with the user. In addition, a human assistant may be dispatched from the assistance center 120 to the operator 104 to personally resolve the problem. In another example, a response may be mailed to the user. Other examples of actions are possible.

Figure 2:
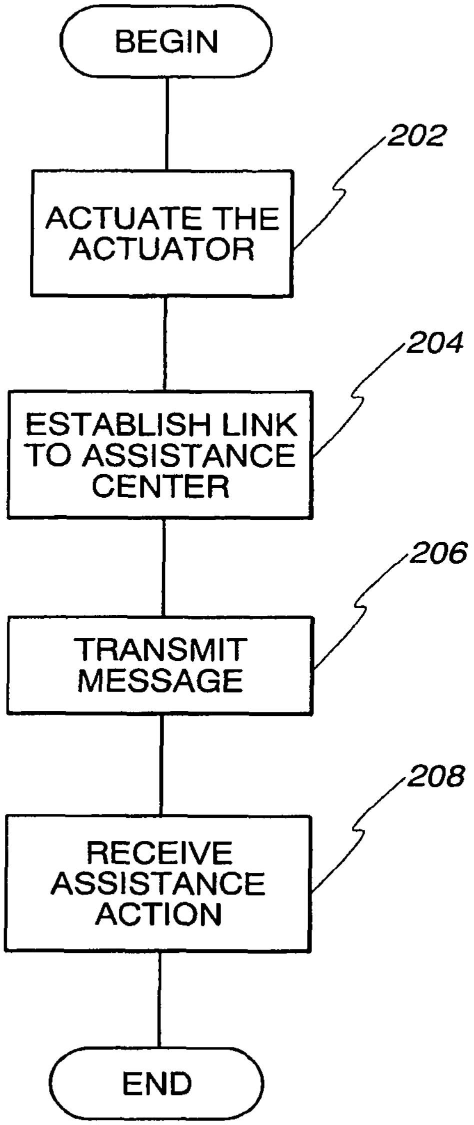
FIG. 2 is a flowchart of an approach for obtaining assistance at a moveable barrier operator according to the present invention.

Referring now to FIG. 2, one example of an approach to obtain assistance for a user at a moveable barrier operator is described. At step 202, an actuator at a moveable barrier actuator is actuated. In one example, the actuator may be a single button that is pressed. Further, the actuator may be a single dedicated button whose only purpose is to call for assistance.

At step 204, a communication link is established between the operator and the call assistance center. In one example, this link is established using a telephone channel. In other examples, this link is established using a satellite communication channel, an Internet channel, or a cellular phone channel. Other examples of communication links are possible.

At step 206, a message is transmitted over the communication channel. This message indicates that the user at the moveable barrier operator desires assistance. The message may also include additional information from the operator that may be useful in determining an action to take. For example, the additional information may include electrical or power conditions at the operator as well as the state of the operator. At step 208, the user at the moveable barrier operator receives assistance from the assistance center. The action may occur over the same link or a different link that is used to send the message. For example, the user at the moveable barrier operator may receive a telephone call from personnel at the assistance center. In another example, personnel at the assistance center may be dispatched to the operator to resolve the problem. Other examples of actions are possible.

Figure 3:
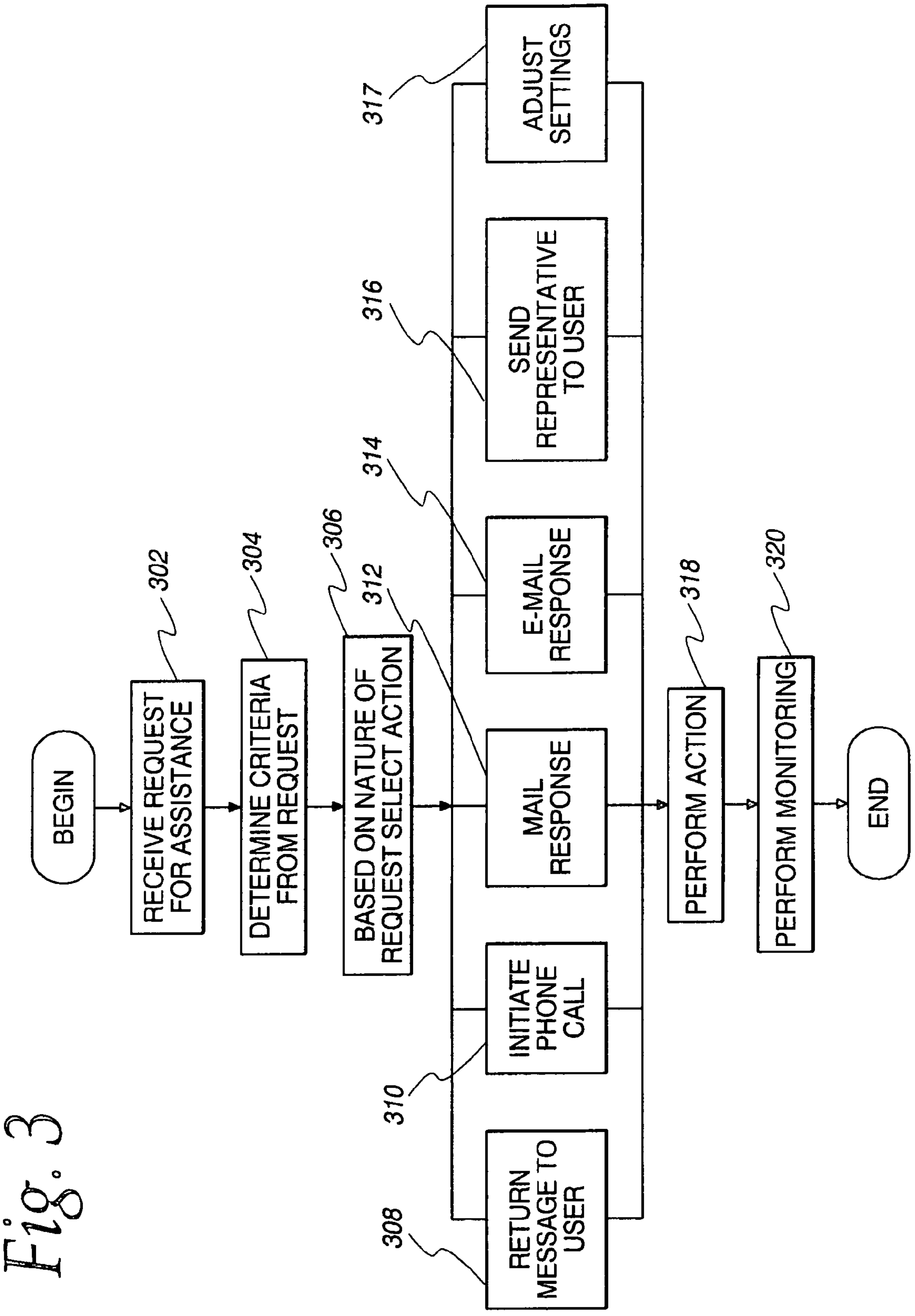
FIG. 3 is a flowchart of an approach for supplying assistance to a user at a moveable barrier operator from an assistance center according to the present invention.

Referring now to FIG. 3, another example of an approach for providing assistance to a user at a moveable barrier operator is described. At step 302, a request for assistance is received at an assistance center. The request may be in the form of a message generated at an operator when a user at the operator requests assistance. The request may describe where the operator is located, a phone number to call, or other pertinent information needed for personnel at the call assistance center to contact the user at the moveable barrier operator. In addition, the request may include addition information that may be used to diagnose and resolve the problem at the operator. In one example, the additional information may include electrical readings, temperatures, or other operating conditions at the operator.

At step 304, criteria to make a response decision is determined from the request. For example, the nature of the request or problem or the identity of the user may be determined. In another example, the personnel at the call assistance center may determine whether a mechanical or electrical problem is present or whether the user is merely requesting operational information for an operator that is currently functioning properly.

At step 306, a branching decision is made depending upon the obtained criteria to one or more of the steps 308, 310, 312, 314, 316, or 317. Requests may always receive the same type of response action depending upon the determined criteria. For example, all requests from a particular user may receive a telephone response regardless of the nature of the problem. Alternatively, responses may vary based upon variable criteria such as the day of the week and identity of the user.

An action to be performed is specified at each of the steps 308, 310, 312, 314, 316, and 317. At step 308, a message is returned to the user. For example, a textual message may be sent back over a phone link if a phone link is used. In another example of an action, at step 310, a phone call can be initiated between personnel at the call assistance center and the moveable barrier operator when two-way voice communications are desired.

Another option, at step 312, is to mail a response to the user at the operator. This action may be an taken when the request is not time sensitive such as a request for warranty information or for a copy of the operating manual of the barrier operator. At step 314, another option is to email a response to the user. This may be in the form of a traditional email or by using instant measuring if it is determined that the user at the moveable barrier operator has access to a computer or similar device. At step 316, another option is to send a human representative to the user at the moveable barrier operator. This option may be feasible for customers who pay a premium fee for a high level of assistance. Alternatively, the customers can be informed that the service is available for a charge. At step 317, adjustments may be made to settings at the operator.

At step 318, the assistance action or actions selected at steps 308-317 is provided to the user at the moveable barrier operator. At step 320, monitoring is performed. With this step, the personnel at the assistance center may determine if the changes that were made in the action step 318 solved the problem or whether further assistance is required. This step may also be performed earlier to assist personnel at the assistance center in taking the actions.

Thus, approaches are provided that offer quick and timely assistance for users at a moveable barrier operator are provided. The approaches provided herein enable the quick and timely provisioning of assistance from an assistance center for a user at a moveable barrier operator. Users do not have to memorize phone numbers or other information in order to contact the assistance center. Consequently, repairs or alterations to the barrier or the barrier operator may be made in a timely manner.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A moveable barrier operator comprising:

an actuator;

a transmitter having an output;

a controller coupled to the actuator and the transmitter, the controller programmed to form a message in response to a user actuation of the actuator, the message indicating a request for assistance, wherein the controller is programmed to establish a communication channel between the moveable barrier operator and an assistance center and to transmit the message to the assistance center at the output of the transmitter over the communication channel; and monitoring circuitry of the controller configured to relay settings of the operator to the assistance center over the communication channel in response to the user actuation of the actuator;

wherein the controller is configured to adjust settings selected from the group consisting of a maximum travel distance, force settings, a speed of travel, a pause time of the barrier, and combinations thereof, the settings adjusted according to messages received from the assistance center regarding the settings of the operator relayed by the monitoring circuitry.

2. The moveable barrier operator of claim 1 further comprising a motor connected to a barrier and wherein the controller is configured to activate the motor to move the barrier between opened and closed positions.

3. The moveable barrier operator of claim 1 wherein the monitoring circuitry is configured to relay settings selected from the group consisting of a maximum travel distance, serial number information, an amount of force required, a speed of travel, error information, a force, a number of usages, a temperature, a force profile, a number of reversals, a code version, reasons for reversals, and combinations thereof.

4. The movable barrier operator of claim 1 wherein the controller is programmed to adjust settings of the operator that control the operator's function in response to conditions determined at the operator.

5. A method for controlling a moveable barrier operator, the method comprising:

receiving at a controller of the moveable barrier operator an indication of a user actuation of an actuator;

in response to receiving the indication:

forming a message indicating a request for assistance, establishing a communication channel between the moveable barrier operator and an assistance center, transmitting the message to the assistance center over the communication channel, and relaying at least one setting of the operator that controls the operator's function in response to conditions determined at the operator to the assistance center over the communication channel;

after relaying the at least one setting, receiving a message from the assistance center regarding adjusting one or more of the at least one setting;

in response to receiving the message from the assistance center, adjusting the one or more of the at least one setting of the operator according to message received from the assistance center, wherein the adjusting the one or more of the at least one setting of the operator comprises adjusting at least one setting selected from the group consisting of a maximum travel distance, force settings, a speed of travel, a pause time of barrier, and combinations thereof.

6. The method of claim 5 wherein the relaying at least one setting comprises relaying at least one setting selected from the group consisting of a maximum travel distance, serial number information, an amount of force required, a speed of travel, error information, a force, a number of usages, a temperature, a force profile, a number of reversals, a code version, reasons for reversals, and combinations thereof.

7. A moveable barrier operator comprising:

a transmitter having an output;

a controller coupled to the transmitter and in communication with an actuator, the controller programmed to form a message in response to a user actuation of the actuator, the message indicating a request for assistance, wherein the controller is programmed to establish a communication channel between the moveable barrier operator and an assistance center and to transmit the message to the assistance center at the output of the transmitter over the communication channel; and monitoring circuitry of the controller configured to relay settings of the operator to the assistance center over the communication channel in response to the user actuation of the actuator;

wherein the controller is configured to adjust settings selected from the group consisting of a maximum travel distance, force settings, a speed of travel, a pause time of the barrier, and combinations thereof, the settings adjusted according to messages received from the assistance center regarding the settings of the operator relayed by the monitoring circuitry.

8. The moveable barrier operator of claim 7 further comprising a motor connected to a barrier and wherein the controller is configured to activate the motor to move the barrier between opened and closed positions.

9. The moveable barrier operator of claim 7 wherein the monitoring circuitry is configured to relay settings selected from the group consisting of a maximum travel distance, serial number information, an amount of force required, a speed of travel, error information, a force, a number of usages, a temperature, a force profile, a number of reversals, a code version, reasons for reversals, and combinations thereof.

10. The movable barrier operator of claim 7 wherein the controller is programmed to adjust settings of the operator that control the operator's function in response to conditions determined at the operator.

11. The movable barrier operator of claim 7 further comprising the actuator.

* * * * *